Aug. 17, 1926.
F. W. HILSCHER
COAGULOMETER
Filed July 31, 1924
1,596,536
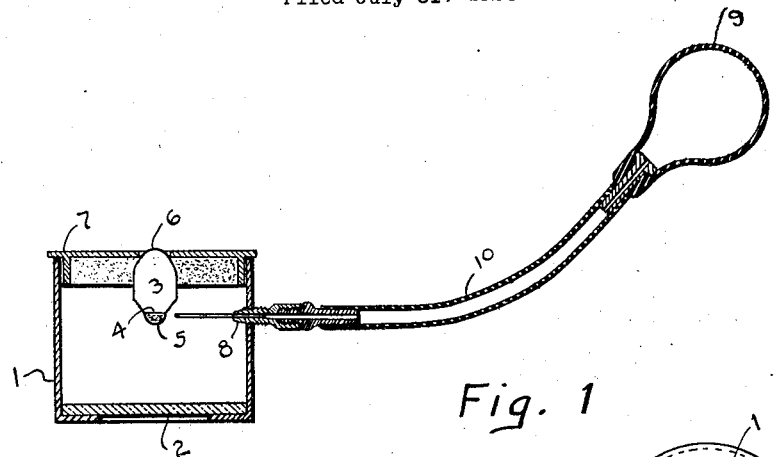
Fig. 1
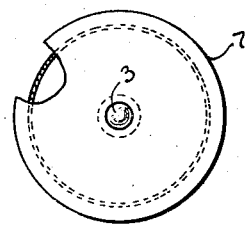
Fig. 3
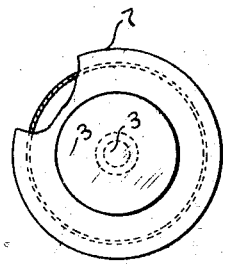
Fig. 4
Fig. 5
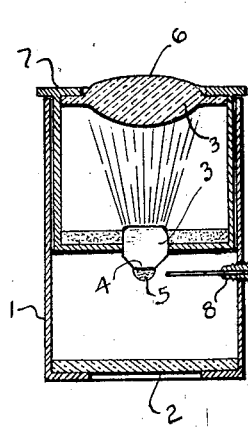
Fig. 2
INVENTOR
Franz W. Hilscher Patented Aug. 17, 1926.

1,596,536

UNITED STATES PATENT OFFICE.

FRANK W. HILSCHER, OF SPOKANE, WASHINGTON.

COAGULOMETER.

Application filed July 31, 1924. Serial No. 729,404.

My invention relates to improvements in coagulometers, in which I combine a specially constructed microscope, having a fixed, and properly adjusted focal distance from the specimen of blood under examination, with an air chamber, having a glass or other transparent bottom, to hold air in which the test is made. Through the side of the air chamber projects a small metal tube through which by means of a hand bulb and flexible connection a gentle stream of air can be forced against the specimen of blood placed on the lower end flat surface of the lens of the microscope projecting into the air chamber.

The objects of my improvement are, first, to provide a simple, accurate, and convenient method for testing the time required for coagulation of blood in a single instrument, precautionary to a surgical operation; second, to provide a safe, accurate, and more expeditious, and more convenient method for making such test, than heretofore provided for, that does not require expert skill to make the test, as is the case with the use of a separate and adjustable microscope to obtain the correct focal distance.

I attain these objects by the mechanism illustrated in the accompanying drawings, in which—

Fig. 1 is a vertical section of the entire instrument, made with a single truncated lens in the microscope attachment.

Fig. 2 is a vertical section of the entire instrument made with a double truncated lens in the microscope attachment.

Fig. 3 is a top view of the upper cap of the air chamber of the instrument, which constitutes the frame of the single truncated lens of the microscope, projecting through it, and securely attached to hold it in place, and also serves to close the upper end of the air chamber into which the lens projects.

Fig. 4 is also a top view of the upper cap of the instrument made with a double lens, projecting through it, and securely attached to it to hold the lens in place, and cap when in place also serves to close the upper end of the air chamber into which the lens projects, as in Fig. 3, and Fig. 5 is a bottom view of the lower end cap of the air chamber of the instrument, showing the glass, or other transparent aperture for admission of light into the air chamber, which cap when in place serves to close the lower end of the air chamber.

Similar numerals refer to similar parts throughout the several views.

In Fig. 1, numeral 1 represents the frame of the air chamber, 2 the glass or other transparent aperture for admission of light into the air chamber, 3 the single truncated lens of the microscope, which projects into the air chamber, when the cap is in place, 4 the flat or plane surface of the lower end of the lens, 5 the blood specimen on which the test is to be made, 6 the convex end of the lens of the microscope, 7 the rim of the upper cap of the air chamber, 8 a metal air tube projecting through the side of the air chamber, 9 a flexible bulb attached to the metal air tube by means of a flexible connection 10, attached to the metal tube 8.

The only difference between Fig. 1 and Fig. 2 is that Fig. 2, shows the instrument constructed with a double lens microscope, instead of a single lens as shown in Fig. 1. Like numerals represent the same parts in both Fig. 1 and Fig. 2, except that numerals 3—3 in Fig. 2 represent the double lens of the microscope.

In Fig. 3, numeral 3 shows the convex end of the single lens of the microscope, held in place in the top cap of the air chamber, 7 the rim of the cap.

In Fig. 4 the same parts are shown as in Fig. 3, except that numerals 3—3 represent a double lens of the microscope instead of the single lens shown in Fig. 3.

In Fig. 5, numeral 2 is the glass or other transparent aperture in the lower end cap of the air chamber of the instrument for the admission of light into the air chamber.

In my invention as above described the test for the time required for coagulation of blood is made by placing a drop of blood on the flat or plane surface of the lower end of the lens of the microscope projected into the air chamber, then with both caps of the air chamber in place, closing the air chamber, gently press the bulb, forcing air against the drop of blood on the lower end of the lens, and observe the movements of the blood corpuscles. If the blood is in good condition, it coagulates quickly, and in a few minutes the movements of the corpuscles cease, showing that coagulation has taken place, and the patient from whom the blood being tested has been taken may be regarded in condition to undergo a surgical operation safely without danger from excessive bleeding.

This test is a precaution that should be made in every case before operation, where a surgical operation is contemplated.

Prior to my invention such a test was frequently made in a similar way by using a coagulometer air chamber with a bulb attachment, and a separate, detached microscope, requiring special focal adjustment to obtain proper focal distance of the microscope from the blood under observation, which was a more difficult and tedious method of arriving at the desired results, and less accurate, and less expeditious, and required an expert operator.

I claim as my invention:

A coagulometer comprising the following elements in combination; viz, a tube, a bottom for same provided with an aperture for admitting light for purposes of illumination, a glass cover for the aperture, a shorter tube telescoping into the upper portion of the first mentioned tube, a bottom therefore provided with a central aperture, a lens fitted to said aperture and provided with a lower flat surface adapted for sustaining a drop of blood, said lens projecting into the chamber formed between the bottoms of said tubes, a small tube passing laterally into said chamber, a flexible tube connected to said small tube, a collapsible bulb connected to said flexible tube, whereby air can be introduced into said chamber, and a second lens situated above said first mentioned lens and supported upon the upper end of said second mentioned tube; substantially as set forth in said original specifications.

FRANK W. HILSCHER.